US010028155B2

(12) United States Patent
Pedersen et al.

(10) Patent No.: US 10,028,155 B2
(45) Date of Patent: Jul. 17, 2018

(54) BUFFER MANAGEMENT FOR WIRELESS NETWORKS

(71) Applicant: NOKIA SOLUTIONS AND NETWORKS OY, Espoo (FI)

(72) Inventors: Klaus Ingemann Pedersen, Aalborg (DK); Troels Emil Kolding, Klarup (DK); Lucas Chavarria Gimenez, Aalborg (DK); Ejaz Shah, Algonquin, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/280,322

(22) Filed: Sep. 29, 2016

(65) Prior Publication Data

US 2018/0091986 A1    Mar. 29, 2018

(51) Int. Cl.
*H04W 36/16* (2009.01)
*H04W 24/02* (2009.01)
(Continued)

(52) U.S. Cl.
CPC ........... *H04W 24/02* (2013.01); *H04W 36/26* (2013.01); *H04W 76/028* (2013.01); *H04W 76/19* (2018.02)

(58) Field of Classification Search
CPC ............. H04W 36/02; H04W 36/0033; H04W 36/385; H04W 36/0011; H04W 36/0088;
(Continued)

(56) References Cited

U.S. PATENT DOCUMENTS

2008/0267131 A1    10/2008  Kangude et al.
2009/0279507 A1*   11/2009  Kanazawa ............ H04W 36/24
                                                    370/332
(Continued)

FOREIGN PATENT DOCUMENTS

EP          808034 A2    11/1997
WO     2015127987 A1     9/2015

OTHER PUBLICATIONS

3rd Generation Partnership Project; Technical Specification Group Radio Access Network; Study on New Radio Access Technology (Release 14), 3GPP TR 38.912 V0.0.2 (Sep. 2016), 11 pages.
(Continued)

*Primary Examiner* — Quan M Hua
(74) *Attorney, Agent, or Firm* — Brake Hughes Bellermann LLP

(57) ABSTRACT

A technique includes making a decision to perform a handover of a user device from a source cell to a target cell at a scheduled handover time, determining, by a source base station associated with the source cell, an estimated data rate for transmitting data from the source cell to the user device between a time of the handover decision and the scheduled handover time, determining, based on the estimated data rate and a difference between the time of the handover decision and the scheduled handover time, a portion of data stored in a data buffer associated with the source cell for the user device to be forwarded to the target cell before the scheduled handover time, and forwarding, from the source cell to the target cell before the scheduled handover time, the portion of data stored in the data buffer for the user device.

23 Claims, 4 Drawing Sheets

Example Wireless Network 130

(51) Int. Cl.
*H04W 76/02* (2009.01)
*H04W 36/26* (2009.01)
*H04W 76/19* (2018.01)

(58) Field of Classification Search
CPC ..... H04W 36/023; H04W 8/06; H04W 28/22; H04W 36/0055; H04W 36/0072; H04W 74/006; H04L 47/10; H04L 47/14; H04L 47/34; H04L 49/9057
See application file for complete search history.

(56) References Cited

U.S. PATENT DOCUMENTS

| | | |
|---|---|---|
| 2011/0026494 A1 | 2/2011 | Nagasawa et al. |
| 2012/0155431 A1 | 6/2012 | Kim et al. |
| 2015/0244429 A1* | 8/2015 | Zhang ................. H04B 7/024 370/329 |
| 2017/0127334 A1* | 5/2017 | Park ................. H04L 5/0055 |

OTHER PUBLICATIONS

Barbera, Simone et al., "Synchronized RACH-less Handover Solution for LTE Heterogeneous Networks", IEEE, 2015, 5 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 3GPP TS 36.300 V13.4.0 (Jun. 2016), 310 pages.
International Search Report and Written Opinion for International Application PCT/EP2017/069429, dated Sep. 25, 2017, 18 pages.

* cited by examiner

BUFFER MANAGEMENT FOR WIRELESS NETWORKS

TECHNICAL FIELD

This description relates to communications, and in particular, to a buffer management for wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, user devices or mobile stations are referred to as user equipments (UEs).

A handover may be performed for a user device from a source cell to a target cell. In some cases, data buffered at the source cell may be forwarded to the target cell.

SUMMARY

According to an example implementation, a method includes making a decision to perform a handover of a user device from a source cell to a target cell at a scheduled handover time; determining, by a source base station associated with the source cell, an estimated data rate for transmitting data from the source cell to the user device between a time of the handover decision and the scheduled handover time; determining, based on the estimated data rate and a difference between the time of the handover decision and the scheduled handover time, a portion of data stored in a data buffer associated with the source cell for the user device to be forwarded from the source cell to the target cell before the scheduled handover time; and forwarding, from the source cell to the target cell before the scheduled handover time, the portion of data stored in the data buffer for the user device.

According to an example implementation, a non-transitory computer-readable storage medium includes instructions stored thereon that, when executed by at least one processor, are configured to cause a computing system to at least: make a decision to perform a handover of a user device from a source cell to a target cell at a scheduled handover time; determine, by a source base station associated with the source cell, an estimated data rate for transmitting data from the source cell to the user device between a time of the handover decision and the scheduled handover time; determine, based on the estimated data rate and a difference between the time of the handover decision and the scheduled handover time, a portion of data stored in a data buffer associated with the source cell for the user device to be forwarded from the source cell to the target cell before the scheduled handover time; and forward, from the source cell to the target cell before the scheduled handover time, the portion of data stored in the data buffer for the user device.

According to an example implementation, an apparatus includes means for making a decision to perform a handover of a user device from a source cell to a target cell at a scheduled handover time; means for determining, by a source base station associated with the source cell, an estimated data rate for transmitting data from the source cell to the user device between a time of the handover decision and the scheduled handover time; means for determining, based on the estimated data rate and a difference between the time of the handover decision and the scheduled handover time, a portion of data stored in a data buffer associated with the source cell for the user device to be forwarded from the source cell to the target cell before the scheduled handover time; and means for forwarding, from the source cell to the target cell before the scheduled handover time, the portion of data stored in the data buffer for the user device.

According to an example implementation, a computer program product includes a computer-readable storage medium and storing executable code that, when executed by at least one data processing apparatus, is configured to cause the at least one data processing apparatus to perform a method including: making a decision to perform a handover of a user device from a source cell to a target cell at a scheduled handover time; determining, by a source base station associated with the source cell, an estimated data rate for transmitting data from the source cell to the user device between a time of the handover decision and the scheduled handover time; determining, based on the estimated data rate and a difference between the time of the handover decision and the scheduled handover time, a portion of data stored in a data buffer associated with the source cell for the user device to be forwarded from the source cell to the target cell before the scheduled handover time; and forwarding, from the source cell to the target cell before the scheduled handover time, the portion of data stored in the data buffer for the user device.

The details of one or more examples of implementations are set forth in the accompanying drawings and the description below. Other features will be apparent from the description and drawings, and from the claims.

DETAILED DESCRIPTION

Figure 1:
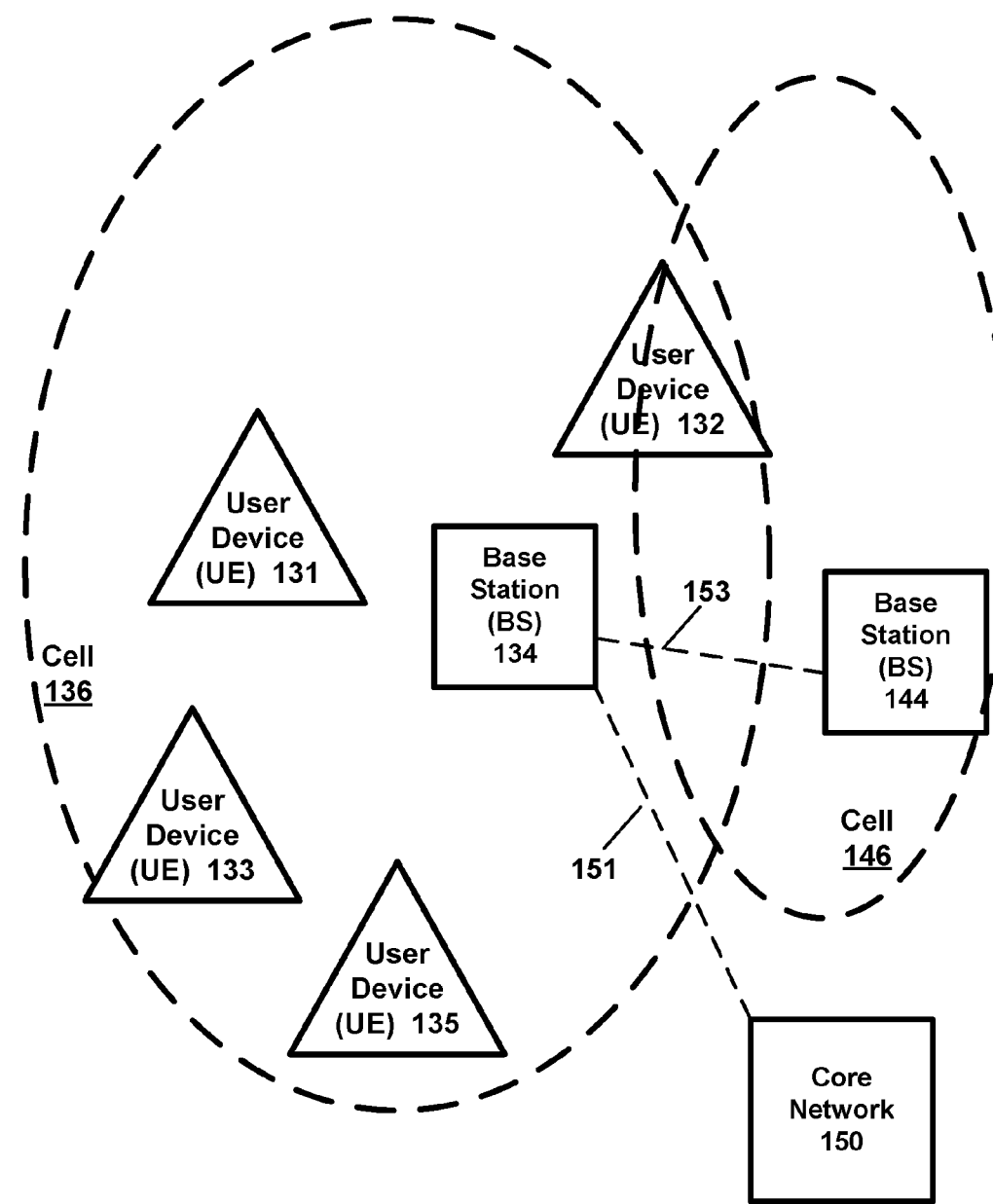
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may be also be carried out by any node, server or host which may be operably coupled to a transceiver, such as a remote radio head. BS (or AP) 134 is associated with and provides wireless coverage (or wireless services) within a cell 136, including to user devices 131, 132, 133 and/or 135. Although only four user devices are shown as being connected or attached to BS 134, any number of user devices may be provided. BS 134 is also connected to a core network 150 via a S1 interface 151. This is merely one simple example of a wireless network, and others may be used.

By way of illustrative example, wireless network 130 may include multiple BSs. For example, a BS 144, which is associated with and provides wireless services or coverage within cell 146, may be connected to (and provide wireless services to) one or more of user devices 131, 132, 133 and/or 135. Although not shown, BS 144 is also connected to core network 150. BS 134 (associated with and providing wireless services for cell 136) is connected with BS 144 (associated with and providing wireless services for cell 146) via a BS-to-BS interface (e.g., which may be referred to as an X2 interface), shown as line 153, for example.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

By way of illustrative example, the various example implementations or techniques described herein may be applied to various user devices, such as machine type communication (MTC) user devices, enhanced machine type communication (eMTC) user devices, Internet of Things (IoT) user devices, and/or narrowband IoT user devices. IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans.

Also, in an example implementation, a user device or UE may be a UE/user device with ultra reliable low latency communications (URLLC) applications. A cell (or cells) may include a number of user devices connected to the cell, including user devices of different types or different categories, e.g., including the categories of MTC, NB-IoT, URLLC, or other UE category.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, or wireless devices, such as LTE, LTE-A, 5G, cmWave, and/or mmWave band networks, IoT, MTC, eMTC, URLLC, etc., or any other wireless network or wireless technology. These example networks or technologies are provided only as illustrative examples, and the various example implementations may be applied to any wireless technology/wireless network.

According to an illustrative example of FIG. 1, a user device 132 may be moving left to right. Based on a measurement report sent by the user device 132 to a source cell 136 (source BS 134), a handover of the user device 132 may be triggered from the source cell 136 to a target cell 146. At some point, data stored in data (or transmit) buffer at the source cell 136/source BS 134 for the user device 132 may be transferred or forwarded via X2 interface 153 to the target cell 146/target BS 144, so that the target cell may forward such data to the user device 132 after handover. According to an example implementation, some challenges or questions exist as to how much of the data stored in the data buffer of the source cell 136 should be transmitted to the user device 132 after a handover decision has been made, and/or when and how much of the stored data in the data buffers at the source cell 136/source BS 134 should be transferred/forwarded via X2 interface 153 to the target cell 146/target BS 144. Therefore, according to an example implementation, data buffers, such as the data buffers at source cell 136/source BS 134 may be managed in order to reduce data interruption time after handover. The cells and BSs shown in FIG. 1 is merely an illustrative example.

Various example implementations may, for example, relate to downlink user-plane buffer handling at a base station or cell for handovers, such as, for example, for synchronous handovers without random access (synchronous RACH-less handovers). Synchronous RACH-less handovers may include a handover in which a user device obtains a timing advance for a target cell without performing random access with the target cell (also known as a RACH-less handover). As an illustrative example of a RACH-less handover, the user device may use the timing advance for the source cell and signal propagation times or delays for signals received from the source cell and the target cell, to estimate or determine the timing advance for the target cell without requiring the user device to perform a random access procedure with the target cell. An example of a RACH-less handover is described at Barbera, S. et al, "Synchronized RACH-less Handover Solution for LTE Heterogeneous Networks". International Symposium on Wireless Communication Systems (ISWCS), Brussels, August 2015, pp. 755-759.

According to an example implementation, references to various actions (e.g., making decisions, communicating, determining, storing data, receiving data or signals, transmitting or sending data or signals, notifying, selecting, forwarding, . . . ) performed by a source cell may include these actions being performed by a source BS that provides the source cell. Likewise, references to various actions (e.g., making decisions, communicating, determining, storing data, receiving data or signals, transmitting or sending data or signals, notifying, selecting, forwarding, . . . ) performed by a target cell may include these actions being performed by a target BS that provides the target cell.

According to an example implementation of a synchronous handover, the source cell and target cell agree on the time instant (t1) of the handover (a scheduled handover time, t1) of the user device, and the user device may typically be informed in advance of the scheduled handover time (t1). According to an example implementation, until the scheduled handover time, the user device, when scheduled to receive data, continues to receive data from the source cell. At the scheduled handover time, the user device discontinues receiving data or control information from the source cell and begins receiving data and/or control information from the target cell. From a PHY (physical layer)/MAC (media access control layer) perspective, this may suggest that a data interruption time during the handover process is limited to in principle only to a fraction of a transmission time interval (TTI). However, to fully benefit from the synchronous RACH-less handover, proper buffer management and flow switching between the source cell and target cell should be performed. Therefore, various example implementations are described herein relating to data buffer management in order to decrease data interruption time during a handover.

According to an example implementation, a handover for a user device from a source cell to target cell may be caused or triggered when a source cell (associated with a source BS) receives a measurement report from the user device that indicates a signal from a target cell has a higher signal strength or signal quality than a signal received from the source cell, as a very simple example.

The source cell is the serving cell for the user device prior to the handover, and therefore also the cell having buffered downlink data for the user device, as well as the connection to the core network. The source cell receives the radio resource measurement (RRM) measurement report from the user device, triggering the handover process of the user device to the target cell. The source cell hereafter initiates the handover preparation phase, contacting the target cell, as well as agreeing with the target cell on the time of the handover (scheduled handover time, t1). Once the target cell has accepted the handover request, and the source cell and target cell have agreed on the scheduled handover time for the handover, the source cell transmits a handover command to the user device. Thus, a handover decision is made by the source cell and/or target cell. For example, a source cell may make a decision to perform a handover when the source cell receives a handover confirmation from the target cell that confirms or acknowledges that the target cell has accepted the handover request for the user device. A time of the handover decision may be referred to as time t0, and the subsequent scheduled handover time may be referred to as time t1. According to an example implementation, a handover command sent from the source cell to the user device includes the scheduled handover time (t1).

Up until the scheduled handover time (t1) (e.g., including the time between the time of the handover decision (t0) and the scheduled handover time (t1)), the user device continues to receive scheduled data from the source cell. At the scheduled handover time (t1), the user device immediately starts to listen to the target cell, e.g., the user device begins receiving and decoding data from the target cell. However, for the target cell to be able to schedule data to the user device, the target cell needs to have buffered data for downlink transmission to the user device.

For cases with intra-site handovers, i.e., handover between a source cell and a target cell on the same BS, at least in some cases, it may be assumed that there is one downlink transmit buffer for the user device in the BS, which may be accessible for both the source cell and target cell (although such details are typically BS implementation specific). Thus, for an intra-site handover, at the time of the handover, the target cell can immediately start to transmit data from the user's downlink transmit buffer in the BS. However, for inter-site handovers (e.g., source cell provided by a source BS, and a target cell provided by a target BS that is different from the source BS) and/or a distributed radio access network (D-RAN) architecture (e.g., which includes many BSs), the buffer management becomes more complicated. Here, for example, at least some of the buffered data in the source cell's BS (the source BS) should be transferred to the target cell, typically sent via the X2 interface 153 with a certain latency. The question is therefore at which point in time shall the source cell start to transfer buffered data to the target cell? And, how much buffered data should be kept in the source cell for transmission to the user device prior to the handover to make sure that the source cell data buffer for the user device does not run empty before the time of the handover?

In an example implementation, the term "buffer" (or data buffer or transmit buffer) in a cell or BS may be used as a general term for user-specific (or user device-specific) data buffered in the cell/BS. For the specific case of LTE and/or 5G New Radio, data buffered in the BS/eNB may, for example, be at the radio link control/packet data control protocol (RLC/PDCP) layers, for example. In addition, data related to pending HARQ (Hybrid Automatic Repeat Request) retransmissions may also be buffered at the MAC (media access control) layer, i.e., on a HARQ stop-and-wait (SAW) channel.

Thus, buffer management may include determining how much data stored in the data buffer at a source cell should be transmitted to the user device after the handover decision has been made and before the scheduled handover time, and how much of the data stored in the data buffer of the source cell for the user device should be forwarded to the target cell after the handover decision and before the scheduled handover time. For example, if too little data are forwarded from the source cell to the target cell prior to the handover, there may be remaining buffered data in the source cell at the time of the handover, which afterwards should be transferred to the target cell, i.e., subject to the X2 latency (which may increase data interruption at the user device after handover). On the other hand, if too much data are forwarded from the source cell to the target cell prior to the handover, the data buffers at the source cell for the user device may become empty prior to handover, and, thus, preventing the source cell from continuing to send data to the user device, e.g., between the time (t0) that a handover decision is made and the scheduled time (t1) of the handover. In such a case, for example, running the data buffers empty at the source cell may, in some cases, cause a service or data interruption for the user device, but prior to the handover in this case. Also, prematurely (prior to handover) draining the data buffers at the source cell may prevent the source cell from making use of available downlink resources or bandwidth of the source cell-user device channel, which may be an inefficient use of the source cell resources, at least in some cases. The X2 latency may vary from sub-1 ms to tens of ms, depending on the backhaul implementation. Therefore, according to an example implementation, it may be desirable to manage the data buffers at a cell or BS (e.g., to manage the data buffers at the source cell/BS and/or the target cell/BS) to reduce a possible data interruption at the user device when a handover is being performed for the user device from a source cell to a target cell.

Figure 2:
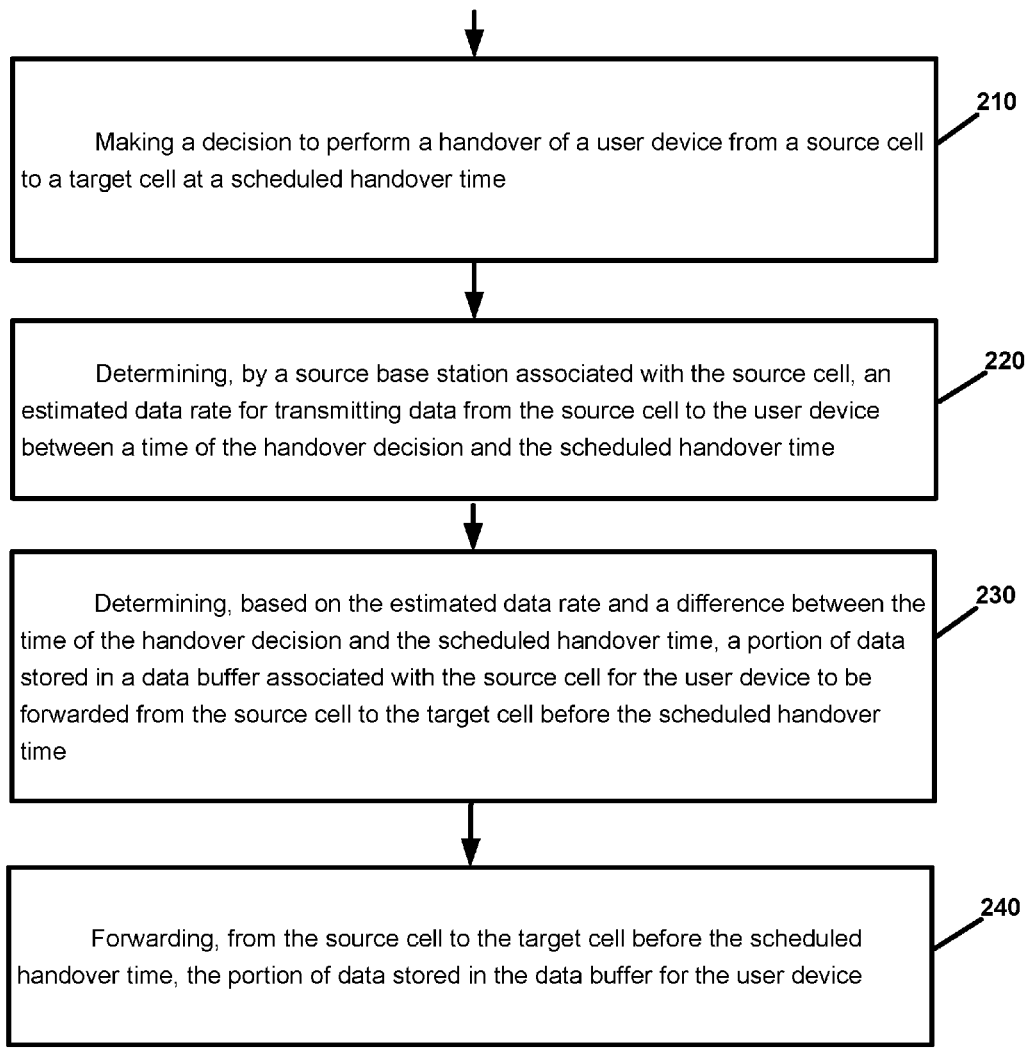
FIG. 2 is a flow chart illustrating operation of a cell, base station or other network device(s) according to an example implementation.

FIG. 2 is a block diagram illustrating operation of a cell or base station (e.g., source cell or source base station) according to an example implementation. Operation 210 includes making a decision to perform a handover of a user device from a source cell to a target cell at a scheduled handover time. Operation 220 includes determining, by a source base station associated with the source cell, an estimated data rate for transmitting data from the source cell to the user device between a time of the handover decision and the scheduled handover time. Operation 230 includes determining, based on the estimated data rate and a difference between the time of the handover decision and the scheduled handover time, a portion of data stored in a data buffer associated with the source cell for the user device to be forwarded from the source cell to the target cell before the scheduled handover time. And, operation 240 includes forwarding, from the source cell to the target cell before the scheduled handover time, the portion of data stored in the data buffer for the user device.

According to an example implementation of the method of FIG. 2, the making a decision to perform a handover may include: receiving a measurement report that reports a signal value for at least the target cell; communicating, by the source base station associated with the source cell with a target base station associated with the target cell, to make a decision to perform a handover of the user device from the source cell to the target cell and to determine the scheduled handover time for the handover; and sending, to the user device, a handover command indicating the scheduled handover time for the user device to perform the handover from the source cell to the target cell.

According to an example implementation of the method of FIG. 2, the determining the estimated data rate is performed based on at least one of the following: channel quality information (e.g., CQI) received by the source cell from the user device; stored information related to previous handovers between the source cell and the target cell; a number of available resources or resource blocks that are available to be used by to transmit data from the source cell to the user device; a quality of service (QoS) or priority of transmissions from the source cell to the user device; and a guaranteed bit rate requirement for the user device.

According to an example implementation of the method of FIG. 2, the determining a portion of data stored in a data buffer associated with the source cell to be forwarded to the target cell may include determining a first amount of data (M1) to be forwarded to the target cell by performing the following: determining, based on the estimated data rate, a second amount of data (M2) that can be transmitted from the source cell to the user device between the time of the handover decision and the scheduled handover time; and determining the first amount of data (M1) to be forwarded from the source cell to the target cell as an amount of data stored in the data buffer in excess of the second amount of data (M2).

According to an example implementation of the method of FIG. 2, the determining the second amount of data (M2) is performed according to the following: $M2=(t1-t0)*R$, where t0 is the time of the handover decision, t1 is the scheduled handover time, R is the estimated data rate, and M2 is the second amount of data that can be transmitted by the source cell to the user device before the scheduled handover time.

According to an example implementation of the method of FIG. 2, the method may further include: transmitting, from the source cell to the user device, the second amount of data (M2) between the time of the handover decision and the scheduled handover time.

According to an example implementation of the method of FIG. 2, the determining the first amount of data (M1) to be forwarded to the target cell is performed according to the following: $M1=T-M2$, where T is the total amount of data stored in the data buffer associated with the source cell for the user device, and M2 is the second amount of data that can be transmitted by the source cell to the user device before the scheduled handover time.

According to an example implementation of the method of FIG. 2, beginning at or after the time of the handover decision (t0), the first amount of data (M1) stored in the data buffer is forwarded from the source cell to the target cell.

According to an example implementation of the method of FIG. 2, the method may further include: selecting, by the source base station, at least some of the data stored in the data buffer associated with the source cell to be forwarded from the source cell to the target cell, wherein the selected data to be forwarded to the target cell has a latency deadline that is after (t1+delta_t), where t1 is the scheduled handover time and delta_t is the estimated time required for the target cell to transmit the selected data to the user device.

According to an example implementation of the method of FIG. 2, the handover of the user device is a synchronous random access (RACH)-less handover.

According to an example implementation of the method of FIG. 2, the method further includes notifying, from the source cell to the target cell, a status of a hybrid ARQ (HARQ) retransmission buffer associated with the source cell for the user device; and forwarding, from the source cell to the target cell, data in the HARQ retransmission buffer associated with the source cell after the handover of the user device from the source cell to the target cell.

Figure 3:
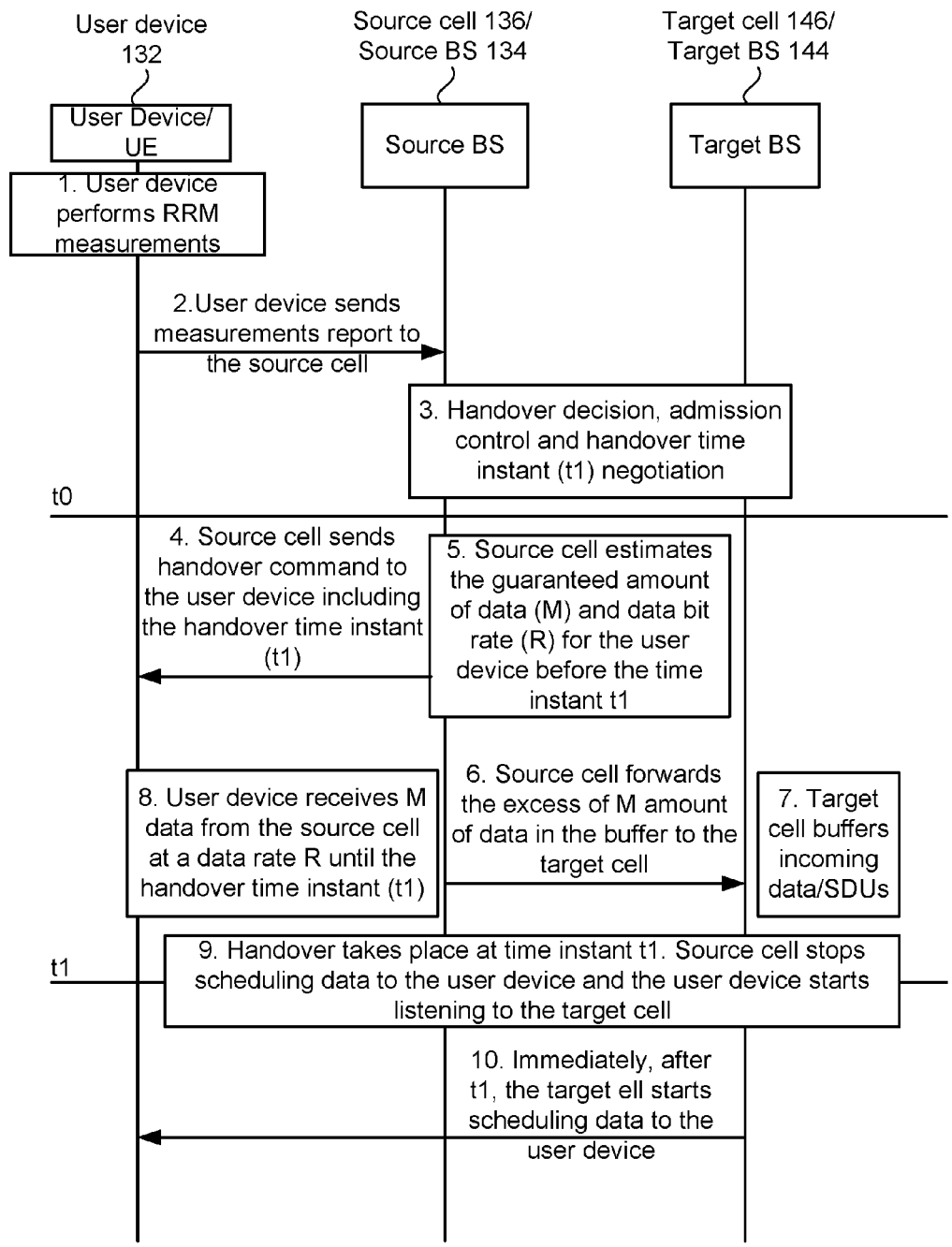
FIG. 3 is a diagram illustrating operation of a wireless system according to an example implementation.

FIG. 3 is a diagram illustrating operation of a wireless system according to an example implementation. In FIG. 3, a handover of user device 132 may be performed from source cell 136 to target cell 146.

Operation 1: At or near time t0 (e.g., a time when a handover decision is made), when the source cell and target cell have agreed on the time (t1) of the synchronous RACH or RACH-less handover, the source cell 136 performs the following actions, e.g., of one or more of (or even all of) operations 2-10:

Operation 2: A handover command is sent from the source cell 136 to the user device 132 (including information of time t1, which is the scheduled handover time).

Operation 3: At or before time t0, a handover decision, admission control and a handover time (t1) are determined or negotiated between the source cell 136 and target cell 146. For example, source cell 136 (e.g., based on a handover confirmation received from target cell 146 confirming that target cell 146 will accept the requested handover of the user device 132 to target cell 146) may make a decision to handover the user device 132 to the target cell 146.

Operation 4: The source cell 136 sends a handover command to the user device 132 including the scheduled handover time (t1).

Operation 5: The source cell estimates the guaranteed amount of data (M) and the downlink transmission data rate, R, that it can provide or guarantee for the user device 132, e.g., before the time t1 or for the time between time t0 and time t1. The source cell 136 may estimate the downlink transmission data rate, R, that it can provide or guarantee for the user device 132 for which a handover is being performed from the source cell 136 to the target cell 146. The source cell may estimate or determine this guaranteed data rate (R) based on, e.g., CQI (channel quality information) reports from the user device 132, stored statistics related to previous handover events between source cell 136 and the target cell 146, user device capability, as well as knowledge of how many radio resources (e.g., physical resource blocks or PRBs) the source cell can provide, reserve or guarantee to use for scheduling the user device (e.g., which may include or take into account quality of service (QoS) prioritization estimations, cell load condition and other user device requirements). For example, the source cell 136 may determine the radio resources (e.g., PRBs) that the source cell 136 can guarantee to use for scheduling of the user device may take into account or may be based on the related QoS attributes for the users/user devices that the source cell 136 is currently serving. If the data flow for the user device is associated with a Guaranteed BitRate (GBR) requirement as one of the QoS parameters, the source cell may, for example, assume R (the data rate)=GBR.

Operation 6: On or after time t0, the source cell 136 forwards the data that is stored in the data buffers of the source cell 136 for the user device 132 that is in excess of M to the target cell 146. The source cell 136 may know or determine (or have information indicating) that it can on average schedule a data amount of M=(t1−t0)×R to the user device 132 prior to the handover time at t1, or during the time period between t0 and t1.

Operation 7: The target cell 146 receives and buffers the received data/service data units (SDUs).

Operation 8: the user device 132 receives the M amount of data from the source cell, e.g., at a data rate R until the scheduled handover time t1.

Operation 9: A handover of the user device 132 is performed to target cell 146 at time t1. The source cell 136 stops scheduling and transmitting data to the user device 132 at or after the handover time t1. The user device 132 now (at time t1 or after t1) begins listening to target cell 146 (e.g., user device 132 begins receiving and decoding data and/or control information from the target cell 146), and user device now (at or after time t1) ceases listening (e.g., receiving and/or decoding data and/or control information from source cell 136) to source cell 136.

Operation 10: At or after time t1, the target cell 146 begins scheduling and transmitting data to the user device 132.

According to an example implementation, e.g., based on operations 5-10, the data buffer at the source cell 136 for user device 132 may be empty (or nearly empty or very close to empty) at the time of the handover (t1). The target cell 146 will have data (e.g., data in excess of M) to immediately begin scheduling to the user device 132 at or just after the time of the handover (time t1), e.g., which may, for example, result in virtually zero (or at least a reduced) data interruption time for the handover of user device 132, for example.

According to an example implementation, at or after time t1, the source cell 136 may also inform the target cell 146 with the status (e.g., presence or not of HARQ retransmission data awaiting retransmission, and/or indication of an amount/quantity of retransmission data in the buffer) of the HARQ Transmission Buffer of the source cell 136 since there may be some pending data in HARQ retransmission buffer of the source cell for the user device 132 that is awaiting retransmission to the user device 132. Since the user device 132 at time t1 switches to target cell 146, user device 132 no longer listens to (e.g., no longer receives and decodes data from) source cell 136 and hence any outstanding packets in HARQ retransmission buffer of source cell should be forwarded to the target cell 146, and then forwarded by the target cell to the user device after the target cell 146 receives the status of HARQ retransmission buffer from the source cell 136. Thus, for example, after time t1 (time of handover), the target cell 146 may receive a status of the HARQ retransmission buffer of the source cell 136 (e.g., indicating presence or an amount of HARQ retransmission data at source cell 136 for the user device 132), and then receive the HARQ retransmission data that is forwarded from the source cell 136. The target cell 146 may then begin retransmitting such HARQ retransmission data to the user device 132.

In another example implementation, the source cell 136 may be configured to report the value of M, or R and to and t1, to the core network (CN (e.g., such as to a serving gateway), such that the core network may ensure that no more data than the source cell 136 can transmit before the time (t1) of the handover are forwarded to the source cell 136, e.g., between the handover decision and the scheduled handover time. The CN may also use this information to forward data in excess of M to the target cell 146.

In yet another example implementation, the decisions of when or how to start forwarding data from the source cell 136 to the target cell 146 may be based on QoS latency parameters for the users' data flow (e.g., based on a protocol data unit (PDU) discard timer information, or L2 latency requirements). For this example implementation, the source cell 136 should start to forward all buffered data with a latency deadline that is longer than t1+delta_t, where delta_t is the estimated time it takes for the target cell 146 (once it receives any forwarded data from the source cell 136) to successfully transmit data in the downlink to the user device 132.

The value of delta_t may either be a configurable network parameter, or delta_t may be provided (e.g., signalled) directly from the target cell 146 to the source cell 136.

According to an example implementation, when the network (e.g., BSs or core network) decides on a time of the handover t1, the value of t1 may be set such that there is sufficient time for the user device processing times, X2 latencies, etc., such that t1−t0 is larger than those delays.

Various example implementations may offer improved buffer management performance, and may assist in reducing downlink data interruption time for a user device that is subject to a synchronous inter-site handover.

According to an example implementation, at least one processor and at least one memory including computer instructions, when executed by the at least one processor, cause the apparatus to: make a decision to perform a handover of a user device from a source cell to a target cell at a scheduled handover time; determine, by a source base station associated with the source cell, an estimated data rate for transmitting data from the source cell to the user device between a time of the handover decision and the scheduled handover time; determine, based on the estimated data rate and a difference between the time of the handover decision and the scheduled handover time, a portion of data stored in a data buffer associated with the source cell for the user device to be forwarded from the source cell to the target cell before the scheduled handover time; and forward, from the source cell to the target cell before the scheduled handover time, the portion of data stored in the data buffer for the user device.

According to an example implementation of the apparatus, causing the apparatus to make a decision to perform a handover causes the apparatus to: receive a measurement report that reports a signal value for at least the target cell; communicate, by the source base station associated with the source cell with a target base station associated with the target cell, to make a decision to perform a handover of the user device from the source cell to the target cell and to determine the scheduled handover time for the handover; and send, to the user device, a handover command indicating the scheduled handover time for the user device to perform the handover from the source cell to the target cell.

According to an example implementation of the apparatus, causing the apparatus to determine the estimated data rate is performed based on at least one of the following: channel quality information received by the source cell from the user device; stored information related to previous handovers between the source cell and the target cell; a number of available resources or resource blocks that are available to be used by to transmit data from the source cell to the user device; a quality of service (QoS) or priority of transmissions from the source cell to the user device; and a guaranteed bit rate requirement for the user device.

According to an example implementation of the apparatus, causing the apparatus to determine a portion of data stored in a data buffer associated with the source cell to be forwarded to the target cell includes causing the apparatus to determine a first amount of data (M1) to be forwarded to the target cell by causing the apparatus to perform the following: determine, based on the estimated data rate, a second amount of data (M2) that can be transmitted from the source cell to the user device between the time of the handover decision and the scheduled handover time; and determine the first amount of data (M1) to be forwarded from the source cell to the target cell as an amount of data stored in the data buffer in excess of the second amount of data (M2).

According to an example implementation of the apparatus, causing the apparatus to determine the second amount of data (M2) is performed according to the following: M2=(t1−t0)*R, where t0 is the time of the handover decision, t1 is the scheduled handover time, R is the estimated data rate, and M2 is the second amount of data that can be transmitted by the source cell to the user device before the scheduled handover time.

According to an example implementation of the apparatus, the apparatus further causes the apparatus to: transmit, from the source cell to the user device, the second amount of data (M2) between the time of the handover decision and the scheduled handover time.

According to an example implementation of the apparatus, causing the apparatus to determine the first amount of data (M1) to be forwarded to the target cell is performed according to the following: M1=T−M2, where T is the total amount of data stored in the data buffer associated with the source cell for the user device, and M2 is the second amount of data that can be transmitted by the source cell to the user device before the scheduled handover time.

According to an example implementation of the apparatus, beginning at or after the time of the handover decision, the first amount of data (M1) stored in the data buffer is forwarded from the source cell to the target cell.

According to an example implementation of the apparatus, and further causing the apparatus to: select, by the source base station, at least some of the data stored in the data buffer associated with the source cell to be forwarded from the source cell to the target cell, wherein the selected data to be forwarded to the target cell has a latency deadline that is after (t1+delta_t), where t1 is the scheduled handover time and delta_t is the estimated time required for the target cell to transmit the selected data to the user device.

According to an example implementation of the apparatus, the handover of the user device is a synchronous random access (RACH)-less handover.

According to an example implementation of the apparatus, and further causing the apparatus to: notify, from the source cell to the target cell, a status of a hybrid ARQ (HARQ) retransmission buffer associated with the source cell for the user device; and forward, from the source cell to the target cell, data in the HARQ retransmission buffer associated with the source cell after the handover of the user device from the source cell to the target cell.

According to an example implementation, a non-transitory computer-readable storage medium includes instructions stored thereon that, when executed by at least one processor, are configured to cause a computing system to at least: make a decision to perform a handover of a user device from a source cell to a target cell at a scheduled handover time; determine, by a source base station associated with the source cell, an estimated data rate for transmitting data from the source cell to the user device between a time of the handover decision and the scheduled handover time; determine, based on the estimated data rate and a difference between the time of the handover decision and the scheduled handover time, a portion of data stored in a data buffer associated with the source cell for the user device to be forwarded from the source cell to the target cell before the scheduled handover time; and forward, from the source cell to the target cell before the scheduled handover time, the portion of data stored in the data buffer for the user device.

Figure 4:
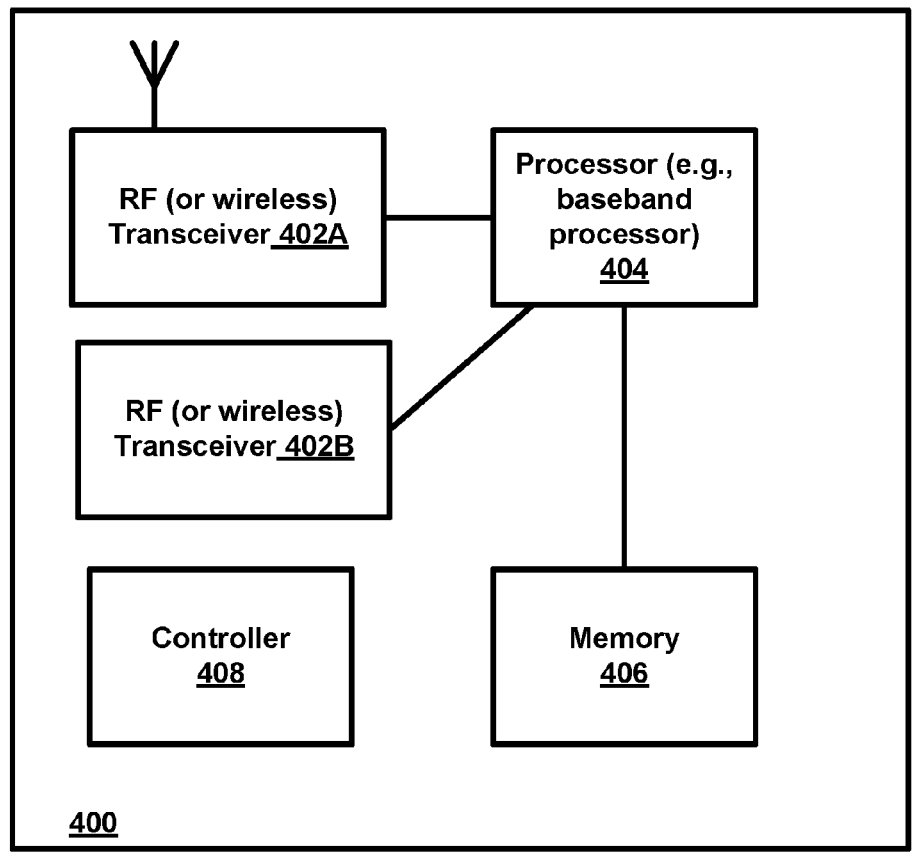
FIG. 4 is a block diagram of a node or wireless station (e.g., network device, base station/access point or mobile station/user device/UE) according to an example implementation.

FIG. 4 is a block diagram of a wireless station (e.g., AP or user device) 400 according to an example implementation. The wireless station 400 may include, for example, one or two RF (radio frequency) or wireless transceivers 402A, 402B, where each wireless transceiver includes a transmitter to transmit signals and a receiver to receive signals. The wireless station also includes a processor or control unit/entity (controller) 404 to execute instructions or software and control transmission and receptions of signals, and a memory 406 to store data and/or instructions.

Processor 404 may also make decisions or determinations, generate frames, packets or messages for transmission, decode received frames or messages for further processing, and other tasks or functions described herein. Processor 404, which may be a baseband processor, for example, may generate messages, packets, frames or other signals for transmission via wireless transceiver 402 (402A or 402B). Processor 404 may control transmission of signals or messages over a wireless network, and may control the reception of signals or messages, etc., via a wireless network (e.g., after being down-converted by wireless transceiver 402, for example). Processor 404 may be programmable and capable of executing software or other instructions stored in memory or on other computer media to perform the various tasks and functions described above, such as one or more of the tasks or methods described above. Processor 404 may be (or may include), for example, hardware, programmable logic, a programmable processor that executes software or firmware, and/or any combination of these. Using other terminology, processor 404 and transceiver 402 together may be considered as a wireless transmitter/receiver system, for example.

In addition, referring to FIG. 4, a controller (or processor) 408 may execute software and instructions, and may provide overall control for the station 400, and may provide control for other systems not shown in FIG. 4, such as controlling input/output devices (e.g., display, keypad), and/or may execute software for one or more applications that may be provided on wireless station 400, such as, for example, an email program, audio/video applications, a word processor, a Voice over IP application, or other application or software.

In addition, a storage medium may be provided that includes stored instructions, which when executed by a controller or processor may result in the processor 404, or other controller or processor, performing one or more of the functions or tasks described above.

According to another example implementation, RF or wireless transceiver(s) 402A/402B may receive signals or data and/or transmit or send signals or data. Processor 404 (and possibly transceivers 402A/402B) may control the RF or wireless transceiver 402A or 402B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   making a decision to perform a handover of a user device from a source cell to a target cell at a scheduled handover time;
   determining, by a source base station associated with the source cell, an estimated data rate for transmitting data from the source cell to the user device between a time of the handover decision and the scheduled handover time;
   determining, based on the estimated data rate and a difference between the time of the handover decision and the scheduled handover time, a portion of data stored in a data buffer associated with the source cell for the user device that can be transmitted using said estimated data rate;
   determining an excess amount of data stored in the data buffer associated with the source cell for the user device based on the determined portion of data; and
   forwarding, from the source cell to the target cell before the scheduled handover time, the excess amount of data stored in the data buffer for the user device.

2. The method of claim 1 wherein the making a decision to perform a handover comprises:
   receiving a measurement report that reports a signal value for at least the target cell;
   communicating, by the source base station associated with the source cell with a target base station associated with the target cell, to make a decision to perform a handover of the user device from the source cell to the target cell and to determine the scheduled handover time for the handover; and
   sending, to the user device, a handover command indicating the scheduled handover time for the user device to perform the handover from the source cell to the target cell.

3. The method of claim 1 wherein the determining the estimated data rate is performed based on at least one of the following:
   channel quality information received by the source cell from the user device;
   stored information related to previous handovers between the source cell and the target cell;
   a number of available resources or resource blocks that are available to be used by to transmit data from the source cell to the user device;
   a quality of service (QoS) or priority of transmissions from the source cell to the user device; and
   a guaranteed bit rate requirement for the user device.

4. The method of claim 1 wherein the determining a portion of data stored in a data buffer associated with the source cell for the user device comprises determining the portion of data (M1) to be forwarded to the target cell by performing the following:
   determining, based on the estimated data rate, the amount of data (M2) that can be transmitted from the source cell to the user device between the time of the handover decision and the scheduled handover time; and
   determining the portion of data (M1) to be forwarded from the source cell to the target cell as an amount of data stored in the data buffer in excess of the amount of data (M2).

5. The method of claim 4 wherein the determining the amount of data (M2) is performed according to the following:
   $M2=(t1-t0)*R$, where t0 is the time of the handover decision, t1 is the scheduled handover time, R is the estimated data rate, and M2 is the amount of data that can be transmitted by the source cell to the user device before the scheduled handover time.

6. The method of claim 4 and further comprising:
   transmitting, from the source cell to the user device, the amount of data (M2) between the time of the handover decision and the scheduled handover time.

7. The method of claim 4 wherein the determining the portion of data (M1) to be forwarded to the target cell is performed according to the following:
   $M1=T-M2$, where T is a total amount of data stored in the data buffer associated with the source cell for the user device, and M2 is the amount of data that can be transmitted by the source cell to the user device before the scheduled handover time.

8. The method of claim 4 wherein, beginning at or after the time of the handover decision, the portion of data (M1) stored in the data buffer is forwarded from the source cell to the target cell.

9. The method of claim 4 and further comprising:
   selecting, by the source base station, at least some of the data stored in the data buffer associated with the source cell to be forwarded from the source cell to the target cell, wherein the selected data to be forwarded to the target cell has a latency deadline that is after (t1+delta_t), where t1 is the scheduled handover time and delta_t is an estimated time required for the target cell to transmit the selected data to the user device.

10. The method of claim 1 wherein the handover of the user device is a synchronous random access (RACH)-less handover.

11. The method of claim 1 and further comprising:
    notifying, from the source cell to the target cell, a status of a hybrid ARQ (HARQ) retransmission buffer associated with the source cell for the user device; and
    forwarding, from the source cell to the target cell, data in the HARQ retransmission buffer associated with the source cell after the handover of the user device from the source cell to the target cell.

12. An apparatus comprising at least one processor and at least one memory including computer instructions, when executed by the at least one processor, cause the apparatus to:

make a decision to perform a handover of a user device from a source cell to a target cell at a scheduled handover time;

determine, by a source base station associated with the source cell, an estimated data rate for transmitting data from the source cell to the user device between a time of the handover decision and the scheduled handover time;

determine, based on the estimated data rate and a difference between the time of the handover decision and the scheduled handover time, a portion of data stored in a data buffer associated with the source cell for the user device that can be transmitted using said estimated data rate;

determine an excess amount of data stored in the data buffer associated with the source cell for the user device based on the determined portion of data; and forward, from the source cell to the target cell before the scheduled handover time, the excess of data stored in the data buffer for the user device.

13. The apparatus of claim 12 wherein causing the apparatus to make a decision to perform a handover comprises causing the apparatus to:

receive a measurement report that reports a signal value for at least the target cell;

communicate, by the source base station associated with the source cell with a target base station associated with the target cell, to make a decision to perform a handover of the user device from the source cell to the target cell and to determine the scheduled handover time for the handover; and send, to the user device, a handover command indicating the scheduled handover time for the user device to perform the handover from the source cell to the target cell.

14. The apparatus of claim 12 wherein causing the apparatus to determine the estimated data rate is performed based on at least one of the following:

channel quality information received by the source cell from the user device;

stored information related to previous handovers between the source cell and the target cell;

a number of available resources or resource blocks that are available to be used to transmit data from the source cell to the user device;

a quality of service (QoS) or priority of transmissions from the source cell to the user device; and a guaranteed bit rate requirement for the user device.

15. The apparatus of claim 12 wherein causing the apparatus to determine a portion of data stored in a data buffer associated with the source cell for the user device comprises causing the apparatus to determine the portion of data (M1) to be forwarded to the target cell by causing the apparatus to perform the following:

determine, based on the estimated data rate, the amount of data (M2) that can be transmitted from the source cell to the user device between the time of the handover decision and the scheduled handover time; and determine the portion of data (M1) to be forwarded from the source cell to the target cell as an amount of data stored in the data buffer in excess of the amount of data (M2).

16. The apparatus of claim 15 wherein causing the apparatus to determine the amount of data (M2) is performed according to the following:

M2=(t1−t0)*R, where t0 is the time of the handover decision, t1 is the scheduled handover time, R is the estimated data rate, and M2 is the amount of data that can be transmitted by the source cell to the user device before the scheduled handover time.

17. The apparatus of claim 15 and further causing the apparatus to:

transmit, from the source cell to the user device, the amount of data (M2) between the time of the handover decision and the scheduled handover time.

18. The apparatus of claim 15 wherein the causing the apparatus to determine the portion of data (M1) to be forwarded to the target cell is performed according to the following:

M1=T−M2, where T is a total amount of data stored in the data buffer associated with the source cell for the user device, and M2 is the amount of data that can be transmitted by the source cell to the user device before the scheduled handover time.

19. The apparatus of claim 15 wherein, beginning at or after the time of the handover decision, the portion of data (M1) stored in the data buffer is forwarded from the source cell to the target cell.

20. The apparatus of claim 15 and further causing the apparatus to:

select, by the source base station, at least some of the data stored in the data buffer associated with the source cell to be forwarded from the source cell to the target cell, wherein the selected data to be forwarded to the target cell has a latency deadline that is after (t1+delta_t), where t1 is the scheduled handover time and delta_t is an estimated time required for the target cell to transmit the selected data to the user device.

21. The apparatus of claim 12 wherein the handover of the user device is a synchronous random access (RACH)-less handover.

22. The apparatus of claim 12 and further causing the apparatus to:

notify, from the source cell to the target cell, a status of a hybrid ARQ (HARQ) retransmission buffer associated with the source cell for the user device; and forward, from the source cell to the target cell, data in the HARQ retransmission buffer associated with the source cell after the handover of the user device from the source cell to the target cell.

23. A non-transitory computer-readable storage medium comprising instructions stored thereon that, when executed by at least one processor, are configured to cause a computing system to at least:

make a decision to perform a handover of a user device from a source cell to a target cell at a scheduled handover time;

determine, by a source base station associated with the source cell, an estimated data rate for transmitting data from the source cell to the user device between a time of the handover decision and the scheduled handover time;

determine, based on the estimated data rate and a difference between the time of the handover decision and the scheduled handover time, a portion of data stored in a data buffer associated with the source cell for the user device that can be transmitted using said estimated data rate;

determine an excess amount of data stored in the data buffer associated with the source cell for the user device based on the determined portion of data; and forward, from the source cell to the target cell before the scheduled handover time, the excess amount of data stored in the data buffer for the user device.

* * * * *

UNITED STATES PATENT AND TRADEMARK OFFICE
CERTIFICATE OF CORRECTION

PATENT NO. : 10,028,155 B2
APPLICATION NO. : 15/280322
DATED : July 17, 2018
INVENTOR(S) : Pedersen et al.

Page 1 of 1

It is certified that error appears in the above-identified patent and that said Letters Patent is hereby corrected as shown below:

In the Claims

In Column 16, Line 2, Claim 3, delete "used by to" and insert -- used to --, therefor.

Signed and Sealed this
Third Day of November, 2020

Andrei Iancu
*Director of the United States Patent and Trademark Office*